United States Patent
Hicks et al.

[11] Patent Number: 5,844,942
[45] Date of Patent: Dec. 1, 1998

[54] PULSE POSITION MODULATION COMMUNICATIONS PROTOCOL

[75] Inventors: Randall G. Hicks, Elmhurst; Warren E. Guthrie, Wheaton; James T. Wesley, Hoffman Estates, all of Ill.

[73] Assignee: Northrop Grumman Corporation, Los Angeles, Calif.

[21] Appl. No.: 807,299

[22] Filed: Feb. 27, 1997

[51] Int. Cl.$^6$ .................................. H03K 7/04; H03K 9/04
[52] U.S. Cl. .................... 375/239; 375/364; 370/520; 370/213; 329/313; 332/112
[58] Field of Search ................... 375/238, 239, 375/364; 370/212, 213, 520; 329/312, 313; 332/108, 109, 112; 371/47.1

[56] References Cited

U.S. PATENT DOCUMENTS

| | | | |
|---|---|---|---|
| 3,852,574 | 12/1974 | Bilgutay et al. | 324/76.63 |
| 4,697,182 | 9/1987 | Swanson | 340/870.02 |
| 4,703,494 | 10/1987 | Ozaki et al. | 375/364 X |
| 4,731,781 | 3/1988 | Nakamura | 370/212 |
| 4,873,663 | 10/1989 | Baranyai et al. | 375/364 X |
| 4,888,791 | 12/1989 | Barndt, Sr. | 375/239 |
| 5,111,407 | 5/1992 | Galpern | 364/483 |
| 5,151,698 | 9/1992 | Pophillat | 341/52 |
| 5,193,111 | 3/1993 | Matty et al. | 379/106.06 |
| 5,206,909 | 4/1993 | Gates | 380/59 |
| 5,241,568 | 8/1993 | Fernandez et al. | 375/364 X |
| 5,257,288 | 10/1993 | Moser | 375/239 X |
| 5,311,581 | 5/1994 | Merriam et al. | 379/106.07 |
| 5,387,906 | 2/1995 | Lee | 340/825.64 |
| 5,394,410 | 2/1995 | Chen | 371/70 |
| 5,469,153 | 11/1995 | Atherton et al. | 340/870.28 |
| 5,493,287 | 2/1996 | Bane | 340/825.52 |
| 5,621,758 | 4/1997 | Suzuki et al. | 375/238 |

*Primary Examiner*—Young T. Tse
*Attorney, Agent, or Firm*—Terry J. Anderson; Karl J. Hoch, Jr.

[57] ABSTRACT

A method for modulating a radio signal has the steps of: predetermining a first time interval so as to define a data word; generating a synchronization pulse, the synchronization pulse initiating a single data word having a length of the predetermined first time interval; and generating a single data pulse within the data word after a second time interval with respect to the synchronization pulse, the length of the second time interval defining at least one character. Defining at least one character by a single data pulse after a second time interval with respect to the synchronization pulse enhances an energy efficiency of the transmitted radio signal while mitigating a duty cycle thereof.

20 Claims, 3 Drawing Sheets

PULSE POSITION MODULATION COMMUNICATIONS PROTOCOL

FIELD OF THE INVENTION

The present invention relates generally to communications protocols and more particularly to a method for modulating a radio signal which provides an enhanced energy efficiency while mitigating the duty cycle thereof.

BACKGROUND OF THE INVENTION

Various different continuous wave communications protocols for transmitting information via radio waves are well known. For example, among the earliest continuous wave communications protocols is Morse Code, wherein each character of the alphabet is represented by a unique combination of dashes and dots. Various other continuous wave protocols, including International Code, have likewise been developed.

Various other communications protocols are known wherein the information transmitted is dependent upon the position of pulses within a train thereof. For example, U.S. Pat. No. 5,151,698 issued to Pophillat on Sep. 29, 1992 and entitled METHOD FOR THE CODING OF A DIGITAL SIGNAL, CODER AND DECODER TO IMPLEMENT THIS METHOD, REGENERATION METHOD AND CORRESPONDING REGENERATOR UTILIZING PULSE POSITION MODULATOR discloses a method for coding a digital signal, as well as a coder and decoder for implementing this method, wherein binary patterns are utilized to encode signals; U.S. Pat. No. 5,206,909 issued to Gates on Apr. 27, 1993 and entitled METHOD FOR SECURE PPM-BASED LASER COMMUNICATIONS discloses a system for secure communications between transmitting and receiving devices in a laser communication system utilizing pulse position modulation wherein a number of optical pulses represent each symbol to be transmitted; and U.S. Pat. No. 5,394,410 issued to Chen on Feb. 28, 1995 and entitled DIFFERENTIALLY CODED AND GUARD PULSE POSITION MODULATION FOR COMMUNICATION NETWORKS discloses a wireless infrared communication system wherein data is encoded for serial transmission by dividing a data transmission period into a plurality of slots, each of which comprises a sequence of pulses.

However, no attempt is made in the prior art to mitigate the duty cycle of radio transmissions via the use of an energy efficient pulse position modulation protocol. As those skilled in the art will appreciate, it may be desirable to mitigate the duty cycle of such radio transmission so as to avoid Federal Communications Commission (FCC) licensing requirements and also so as to mitigate the power requirements for such radio transmissions and thereby enhance battery life.

According to contemporary FCC licensing requirements, on-off keying protocols, such as those commonly used in continuous wave radio communications, may be transmitted at power levels up to 1 milliwatt without licensing. It has been found that pulse position modulation, a type of on-off keying modulation, will meet this requirement as long as the duty cycle thereof is maintained at less than approximately one percent. As such, it is beneficial to provide a pulse position modulation protocol which maintains a one percent duty cycle.

Further, it has been found that radio signals are subject to fading, wherein the transmitted signal is not received properly. Such fading is caused by multiple path transmission wherein the signals transmitted along two or more paths interfere destructively, so as to reduce the level thereof below the point at which they may be detected reliably. Thus, it is further beneficial to provide a pulse position modulation protocol which mitigates fading, thereby facilitating enhanced reception reliability.

Thus, in view of the shortcomings of the prior art, it will be beneficial to provide an energy efficient method for modulating a radio signal having a mitigated duty cycle so as to eliminate the need for FCC licensing and also utilizing a protocol which mitigates transmission errors due to fading.

SUMMARY OF THE INVENTION

The present invention specifically addresses and alleviates the above-mentioned deficiencies associated with the prior art. More particularly, in a first embodiment the present invention comprises a method for modulating a radio signal, wherein the method comprises the steps of predetermining a first time interval so as to define a data word; generating a synchronization pulse, the synchronization pulse initiating a single data word having a length of the predetermined first time interval; and generating a single data pulse within the data word after a second time interval with respect to the synchronization pulse, the length of the second time interval defining at least one character. This process is repeated so as to represent each character of other data unit of a message.

Defining at least one character by a single data pulse after a second time interval with respect to the synchronization pulse enhances an energy efficiency of the transmitted radio signal while mitigating a duty cycle thereof.

According to the present invention, the length of the second interval defines only a single character. As used herein, the term character defines a data unit, and need not be limited to standard alphanumeric characters.

The step of generating a single data pulse after a predetermined time interval (which define the data word) preferably comprises generating a single data pulse having a pulse width of between approximately 200 μsec and approximately 250 μsec. The predetermined first time interval preferably comprises a time interval approximately equal to a multiple of between 600 μsec and 750 μsec. The use of such a multiple to define a time interval is due to the subdivision of the predetermined first time interval into a plurality of cells (each having a length of between approximately 600 μsec and approximately 750 μsec), as discussed in detail below. The character or data unit is defined by which cell the data pulse is placed into.

The step of predefining the first time interval is repeated for each data word represented and is preferably the same for each data word, i.e., results in data words of the same length. Optionally, the process is different for at least two data words, and may be different for each data word. Thus, a different first time interval may optionally be defined for each data word so as to optimize transmission efficiency. Of course, a receiver must either know in advance or be informed of the length of each data word to be transmitted, so as to facilitate proper demodulation thereof.

Further, according to the preferred embodiment of the present invention, fading may be mitigated by dividing each message into a plurality of submessages or packets, each packet being of a duration of less than approximately 0.5 sec. Further, the entire message, comprised of each of the 0.5 sec packets, is transmitted a plurality of times, preferably three times, so as to ensure proper reception thereof.

According to the preferred embodiment of the present invention, information indicative of the packet's position within the message is transmitted along with each packet.

Also, information indicative of the number of times that the message has been transmitted is additionally transmitted along with each message. Optionally, error detection information is also transmitted along with each packet.

According to a second embodiment of the present invention, only one synchronization pulse for each string of data words, such as those defining a packet, is utilized. By eliminating all of the synchronization pulses but the first one for each packet, the duty cycle is further reduced and the energy efficiency of the transmission enhanced.

Thus, the second embodiment of the present invention comprises the steps of predetermining a first time interval so as to define a data word; generating a synchronization pulse, the synchronization pulse initiating a plurality of contiguous data words, each data word having a length of the predetermined first time interval; and generating a single data pulse within each data word, each data pulse being generated after a second time interval with respect to a beginning of the data word within which it is generated, the length of the second time interval defining at least one character.

As in the first embodiment of the present invention, second time interval preferably only defines a single character. Again, as those skilled in the art will appreciate, the second time interval may alternatively define more than one character or a non-standard character or other quantity of data.

In either embodiment of the invention, implementation of the transmit or receive function may be constrained by the time needed to generate or process the signal. To allow additional time for this processing, time delay equal in duration to one or more data cells may be added to the signal waveform, which are called guard cells. These guard cell may be added between the data words, or between the synchronization pulse and the data pulse.

As in the first embodiment of the present invention, each message may be divided into a plurality of separate packets, each packet preferably having a duration of less than approximately 0.5 sec so as to mitigate fading. Further, each message is preferably transmitted three times consecutively so as to enhance the probability of proper reception thereof. Thus, each packet preferably comprises information indicative of the packet's position within the message and each message preferably comprises information indicative of the number of times that the message has been transmitted. Error detection information is also preferably transmitted along with each packet.

As in the first embodiment of the present invention, the error detection information preferably comprises a differential checksum calculated by alternately adding and subtracting the lengths of sequential second time intervals, as discussed in detail below.

A common method for demodulating the radio signal is provided according to both the first and second embodiments of the present invention. The method preferably comprises periodically monitoring an input port of the receiver for the presence of a given state; storing a predetermined number of the monitored states; determining that a synchronization pulse has been received when a predetermined number of the storage states of the input port are in a given state; starting a clock when a synchronization pulse has been determined to have been received; again periodically monitoring the input port for the presence of a given state; again storing a predetermined number of the monitored states; determining that a data pulse has been received when a predetermined number of the stored states of the input port are in the given state; reading a time interval from the clock when it has been determined that a data pulse has been received; and using the length of the time interval to define a character being represented thereby.

The first receive method can use a sampling rate as high as 8 $\mu$sec in a typical application. The step of periodically monitoring an input port for the presence of a given state preferably comprises periodically monitoring the input port for the presence of a high state. The step of periodically monitoring an input port for the presence of a given state further preferably comprises monitoring the input port at time intervals of between approximately 25 $\mu$sec and approximately 40 $\mu$sec.

The step of determining that a pulse has been received when a predetermined number of the stored states of the input port are in the given state comprises determining that a pulse has been received when six of the last eight stored states of the input port are in a given state.

The step of storing a predetermined number of the monitored states preferably comprises storing the monitored states in a software implementation of a first in/first out buffer. As those skilled in the art will appreciate, the monitored states may alternatively be stored within a hardware buffer. Indeed, the method steps of the method of the present invention may be implemented in either software, firmware, or hardware, as desired.

Thus, the present invention provides a method for enhancing energy efficiency of the transmitted radio signal while mitigating the duty cycle thereof. Additionally, methodology is provided for mitigating transmission problems due to fading.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The method for modulating a radio signal of the present invention is illustrated in FIGS. 1–9 which depict two presently preferred embodiments of the invention.

Figure 1:
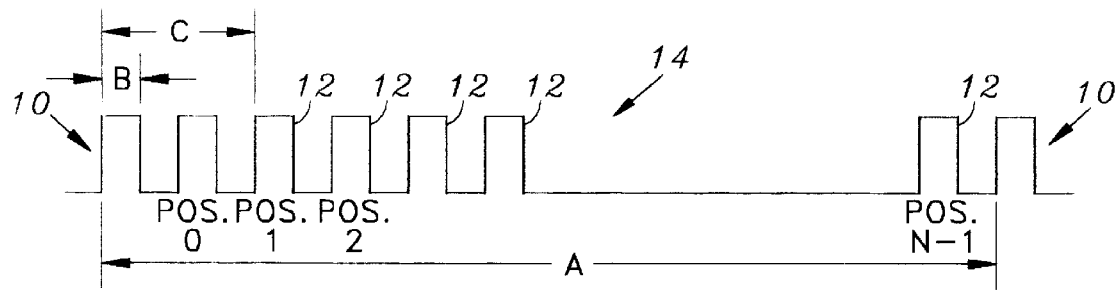
FIG. 1 is a diagram showing a data word according to a first embodiment of the present invention, wherein the data word commences with a synchronization pulse, and also showing a plurality of positions where the single data pulse may be located relative to the synchronization pulse, so as to define the second time interval.

Referring now to FIG. 1, the first embodiment of the present invention comprises the step of generating a synchronization pulse 10 which is followed by a single data pulse 12. FIG. 1 shows a plurality of data pulses 12 to provide an example of where the data pulse may be located relative to the synchronization pulse 10. However, only a single data pulse follows each synchronization pulse (so as to mitigate the duty cycle). The single data pulse 12 is disposed within a predetermined first time interval which defines a data word 14. The first time interval is more precisely defined as the time between the leading edges of two adjacent synchronization pulses and is designated as time A in FIG. 1. The second time interval is more precisely defined as the time between the leading edge of the synchronization pulse 10 and the leading edge of the data pulse 12, such as that designated by time C of FIG. 1, for example. Of course, the second time interval C will vary depending upon where the data pulse 12 is located within the data word 14, and thus depending upon which character is represented thereby. Thus, the length of the second interval, time C, determines the character transmitted.

According to the preferred embodiment of the present invention, the synchronization pulses 10 and the data pulses 12 are generated so as to have substantially identical amplitudes and pulse widths. The pulse width of the synchronization pulse 10 is shown as dimension B of FIG. 1 (which is also the pulse width of the data pulse since the two are equal).

As those skilled in the art will appreciate, by defining at least one character or other quantity of data by a single data pulse 12 which occurs after the transmission of the synchronization pulse 10, the energy efficiency of the transmitted radio signal is enhanced and the duty cycle thereof mitigated. The energy efficiency is enhanced since the amount of energy required to represent a single character, for example, is merely that associated with the transmission of the single synchronization pulse 10 and the single data pulse 12. The duty cycle of the transmission is defined as the total amount of time during which energy is being transmitted for a data word divided by the time required to transmit the data word. Thus, the duty cycle is equal to the pulse width, dimension B, of the synchronization pulse 10 plus the pulse width of the data pulse, also equal to B, divided by the length of time of a data word, dimension A, making the duty cycle equal to 2B divided by A.

Figure 2:
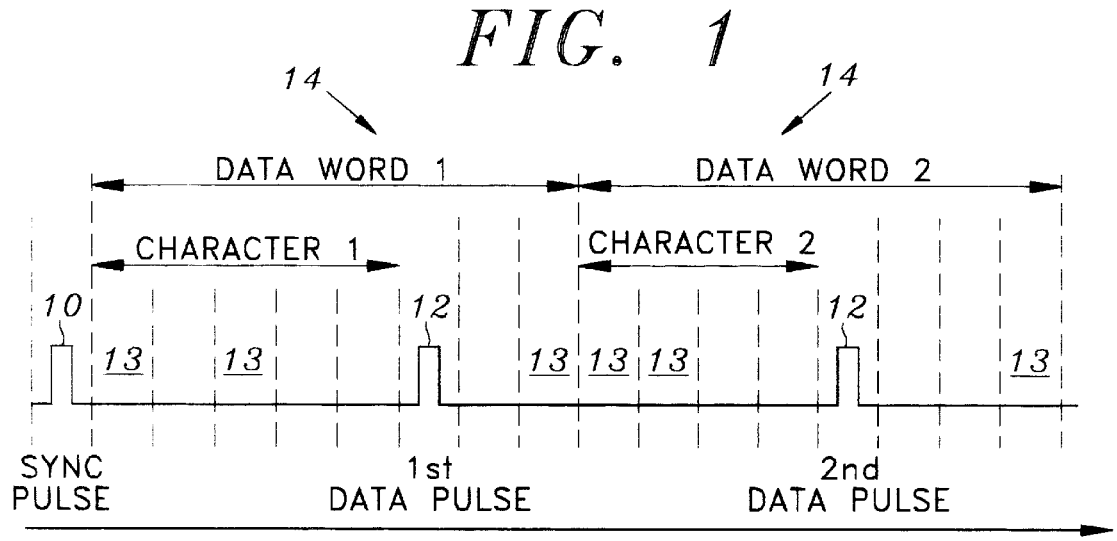
FIG. 2 is a diagram showing the method of modulating a radio signal according to a second embodiment of the present invention wherein only a leading or single synchronization pulse is utilized to define a plurality of data words within a packet, each data word following the single synchronization pulse being defined a predetermined time interval.

Referring to FIG. 2, according to a second embodiment of the present invention, all of the synchronization pulses except for the first synchronization pulse 10 are eliminated. The position of data pulses 12 within the data words 14 which follow the single synchronization pulse 10 determine the character or data transmitted, as in the first embodiment of the present invention. Thus, a plurality of data words 14, each being defined by a substantially equal time interval, follow the single synchronization pulse 10 to facilitate the definition of a plurality of characters, for instance, via the placement of a single data pulse 12 within each data word 14.

As those skilled in the art will appreciate, the energy efficiency of a transmission, according to the second embodiment of the present invention is enhanced with respect to the first embodiment thereof. Also, the duty cycle of a radio transmission, according to the second embodiment of the present invention is mitigated with respect to the first embodiment thereof.

According to the second embodiment of the present invention the duty cycle is defined by the sum of the pulse width of the synchronization pulse 10 plus the pulse width of all of the data pulses 12 within a packet, divided by the time required for transmission of the packet. Clearly, since only a single synchronization pulse 10 is utilized per packet, rather than one synchronization pulse per data pulse as in the first embodiment of the present invention, the duty cycle of a transmission formed according to the second embodiment of the present invention is substantially less than that of a duty cycle formed according to the first embodiment thereof.

Figure 3:
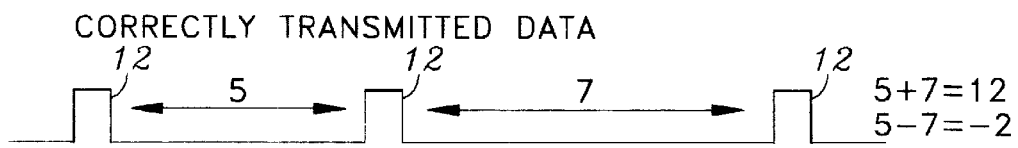
FIG. 3 is a diagram showing why it is necessary to utilize a differential checksum, wherein alternating second time intervals are added and subtracted from one another so as to provide an unambiguous indication that an error has occurred.
Figure 3:
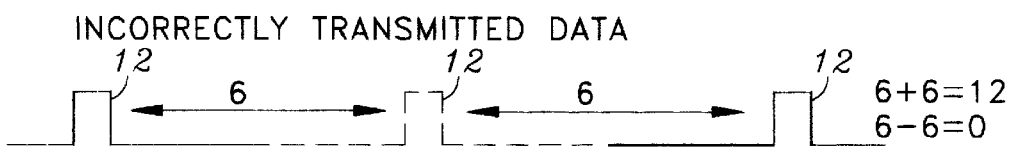

Referring now to FIG. 3, the reason for using a differential checksum to provide error detection according to the present invention is shown. If adjacent time intervals are simply added, then ambiguous checksums are formed. For example, the time intervals of 5 and 7 for correctly transmitted data add to provide a sum equal to 12 and the time intervals of 6 and 6 for incorrectly transmitted data also sum to 12. Thus, merely summing the time intervals between data pulses 12 does not provide an indication that an error has occurred.

However, when differences are formed from the time intervals between adjacent data pulses 12, then unambiguous checksums are formed thereby. For example, the differences between the two time intervals, 5 and 7, is −2 for correctly transmitted data, but is equal to 6 minus 6 or 0 for incorrectly transmitted data, thereby accurately indicating that a transmission error has occurred.

Figure 4:
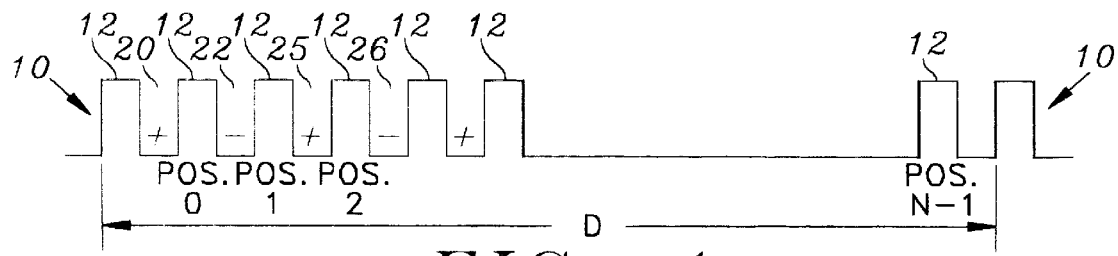
FIG. 4 is a diagram which better illustrates the error detection methodology utilizing a differential checksum according to the present invention.

Referring now to FIG. 4, according to the present invention, the time intervals between adjacent data pulses 12, including the initial or synchronization pulse 10, is alternately added or subtracted, so as to form a checksum. This provides a reliable and accurate indication that an error has occurred. Thus, for example, the first time interval 20 is added to the checksum, while the second time interval 22 is subtracted therefrom, and the third time interval 24 is added thereto, and the fourth time interval 26 is subtracted therefrom, etc. Such a differential checksum may optionally be utilized with either the first or second embodiment of the present invention.

Figure 5:
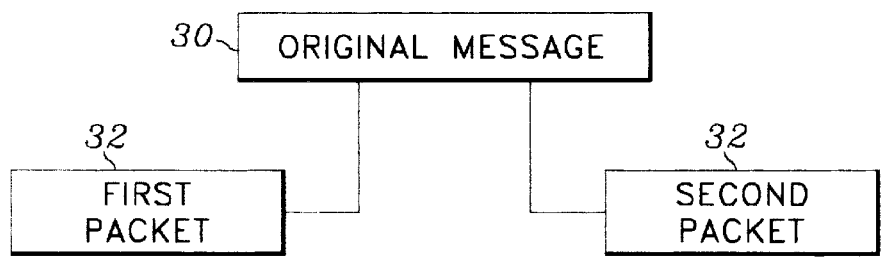
FIG. 5 is a block diagram illustrating the separation of the original message into the first and second half messages or packets.

Referring now to FIG. 5, according to both the first and second embodiments of the present invention, the original message 30, comprising either a stream of characters or a data set, is divided into a plurality of packets, preferably two packets as shown. Each packet 32 therefore contains a portion of the original message 30. It has been found that by limiting the transmission time, by dividing the original message 30 into packets 32, to less than approximately 0.5 sec, that fading tends to be mitigated.

Figure 6:
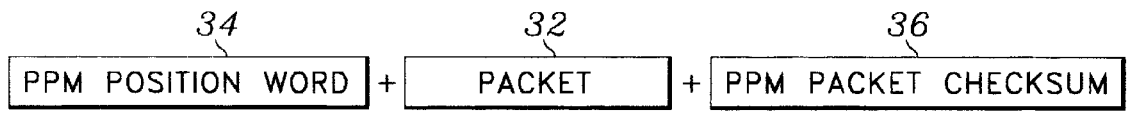
FIG. 6 the addition of the position word and the packet checksum to a packet.

Referring now to FIG. 6, a position word 34 is attached to the front or first portion of each packet 32 and a packet checksum 36, calculated as described in detail above, is added to the end of each packet 32. The position word 34 identifies which of a plurality of packets 32 is being transmitted, since the original message 30 has been divided into a plurality of separate packets 32. As those skilled in the art will appreciate, it is necessary to know where in the original message 30 each packet 32 was formed from, in order to accurately reconstruct the original message 30. Thus, the position word 34 indicates, in a two packet protocol, whether the packet is the first or second. As those skilled in the art will appreciate, various different numbers of packets may be utilized, typically depending upon the total size of the original message.

Figure 7:
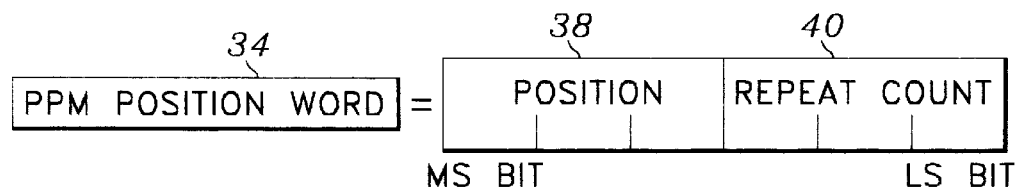
FIG. 7 shows how the position and repeat count are combined to form the position word of FIG. 6.

Referring now to FIG. 7, the position word 34 preferably comprises both position data 38 as described above, and a repeat count 40. According to the preferred embodiment of the present invention, each original message 30 is transmitted a plurality of times, preferably three times, so as to further ensure proper reception thereof. The transmission of the repeat count 40 allows the receiver to ignore subsequent transmitted messages when the first message has been received properly, and also provides an indication of the frequency with which fading occurs.

Figure 8:
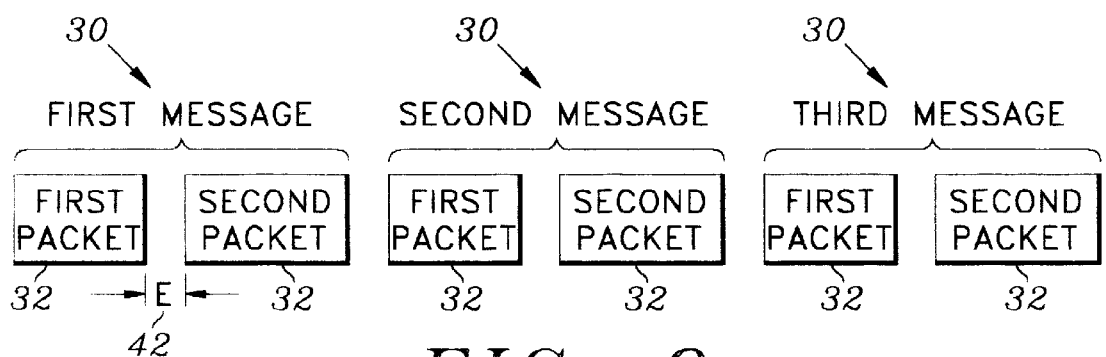
FIG. 8 shows three sets of first and second packets combining to form three separate messages.

Referring now to FIG. 8, each message 30 thus comprises first and second packets 32 and optionally comprises spacing or guard pulses 42 shown as time E, between packets, as well as between messages, if desired.

Figure 9:
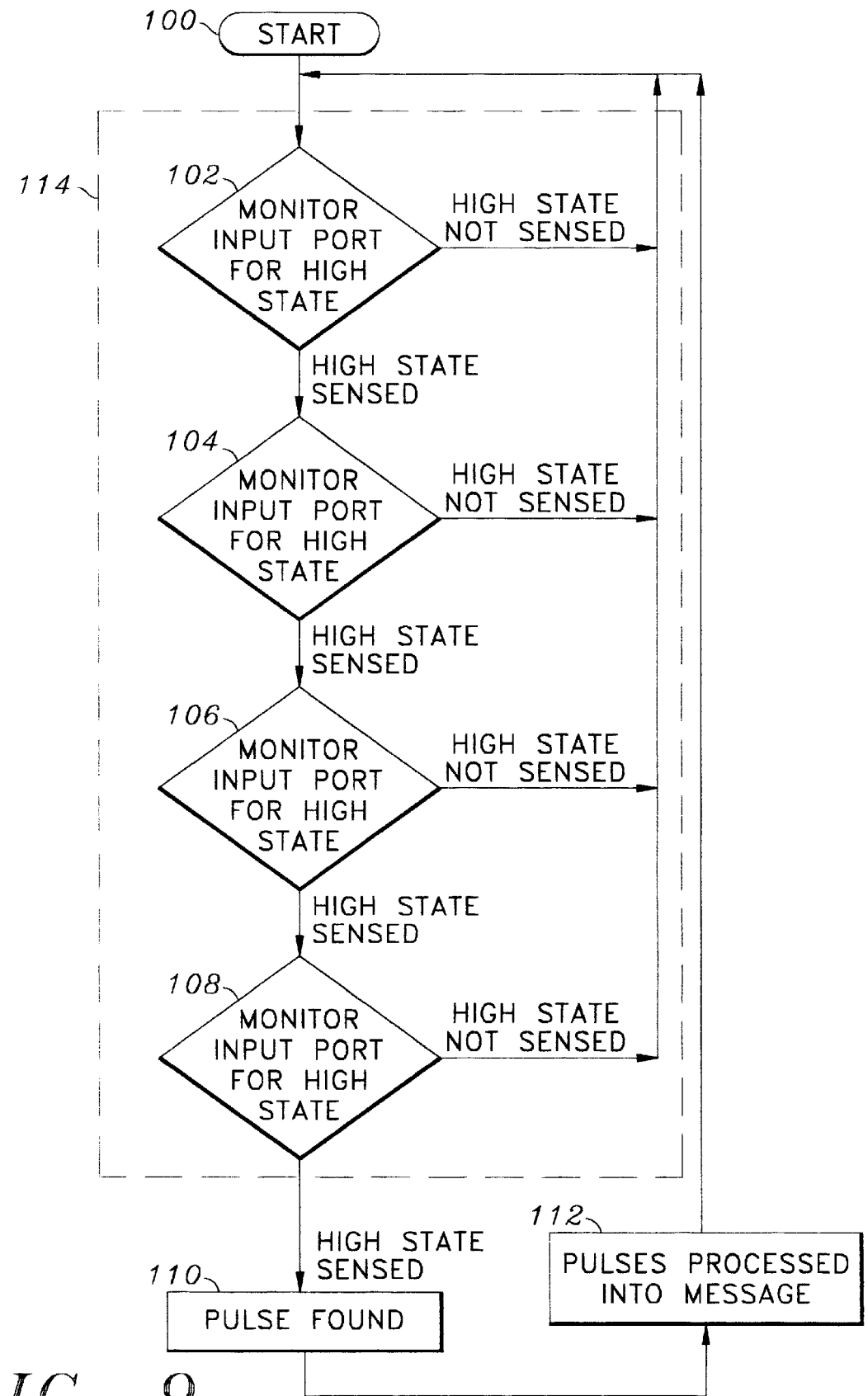
FIG. 9 is a flow diagram of the method for demodulating a radio signal formed according to the methodology of the present invention.

Referring now to FIG. 9, a method for demodulating radio signals modulated according to the first and second embodiments of the present invention is shown. According to the method for demodulating radio signals of the present invention, the state of an input port is monitored for a high state. Thus, after the demodulation algorithm has started 100, then the state of the input port is continuously monitored at substantially identical time intervals until four high states are sensed. Sensing of the first high state 102 causes the algorithm to wait for sensing of the second high state 104. Sensing of the second high state 104 causes the algorithm to wait for sensing of the third high state 106. Sensing of the third high state causes the algorithm to wait for sensing of the fourth high states 108. After all four high states have been sensed, then a pulse has been identified 110 and the pulses so identified are then processed into a message 112, and the process repeated. It is preferable to store high states 103, 104, 106, and 108 in a software implementation of a first in/first out buffer 114 but may also be implemented in firmware or hardware if desired.

Any time that one of the high states 102, 104, 106, 108 is not sensed, then the algorithm resets, so as to begin counting high states again. Thus, short transient pulses, which may result in the incorrect identification thereof as one, two or three high states, do not result in the identification of a pulse.

As discussed above, the present invention provides a method for modulating a radio signal which enhances the energy efficiency of the transmitted radio signal and which mitigates the duty cycle thereof. It is desirable that the duty cycle be maintained at less than one percent, so as to avoid the requirement for licensing by the FCC. As those skilled in the art will appreciate, reduction of the duty cycle also conserves battery power.

The present invention also provides increased throughput in environments where fading would otherwise seriously degrade performance. The present invention also allows transmissions at increased range in those environments where fading is substantial.

Pulse position modulation according to the present invention transmits information, i.e., characters or other data, by utilizing the time measured between pulses to convey information. The first pulse, designated as a synchronization pulse, is used to indicate the start of the first time interval. Subsequent pulses, within a packet, are utilized to define subsequent time intervals. Thus, if the first data pulse is 100 units away from the synchronization pulse, for example, then a particular data value or character is assigned thereto, which is different from that character or data value assigned if the second pulse is 80 units away from the synchronization pulse.

As those skilled in the art will appreciate, oversampling of the received pulses results in increased accuracy and error tolerance.

Further, according to the present invention, the time interval between the synchronization pulse 10 and the first data pulse 12, as well as between subsequent data pulses 12, may conveniently be thought of as being divided into cells (such as 13 of FIG. 2), wherein the placement of a data pulse within a given cell is indicative of the data value or character to be assigned to that particular data pulse 12. Preferably, each cell is defined as having a time duration substantially longer than the data pulse to be placed therein, so as to enhance the accuracy and reliability with which transmissions are made. However, as those skilled in the art will appreciate, a cell may even be substantially narrower than the pulse width associated with the transmitted information. For example, only the leading or trailing edge of the pulse may be utilized to indicate which cell is representative of the character or data transmitted.

The number of cells between synchronization pulses is preferably defined to be some binary power of 2, so as to simplify data translation.

Preferably, the length of each data word, defined by the number of cells contained therein, is the same. However, variable word length may be utilized, as long as the receiver has been pre-programmed to accommodate such variable length words or information regarding the variable word lengths is transmitted to the receiver. These variable length words may find particular application in special applications wherein non-character data is more conveniently transmitted thereby. For example, in instrumentation and control applications, it may be more convenient to divide data into words of varying lengths, due to the varying quantities of data routinely needed to be transmitted.

According to the preferred embodiment of the present invention, the width of each synchronization and data pulse is approximately 200 to 250 $\mu$sec. Each data word preferably comprises 64 cells or individual locations within which a data pulse may be present. The cell size is preferably 600 to 750 $\mu$sec long, such that it is substantially larger than the pulse width. Alternatively, cell size as small as 300 $\mu$sec may be utilized. Preferably, two guard cells are utilized between packets. The guard cells are intermediate of adjacent data words so as to facilitate processing during demodulation. Each guard cell is preferably 200 $\mu$sec long. It has been found that these parameters maintain the transmission below the required one percent duty cycle.

As mentioned above, the demodulation algorithm may utilize either the leading or trailing edge in order to determine the position of a pulse within a data word. However, it has been found that when a high pulse width to cell size is utilized, then a pulse centering algorithm is desirable. This is particularly true if the number of samples per pulse is relatively high. According to the preferred embodiment of the present invention, a sampling rate of approximately five samples per pulse has been found to be sufficient.

It has been found that near the limits of receiver sensitivity, i.e., at extended ranges, the receiver may tend to distort the shape of the received pulses. The leading edge, trailing edge, or middle of each pulse, may be so distorted. In such instances, it has been found that the use of a smoothing algorithm, coupled with pulse centering, provides substantial immunity to pulse signals.

When the original message is split into a plurality of packets, the last packet may be padded with zeros, so as to facilitate the use of packets having identical sizes.

It is understood that the exemplary method for modulating a radio signal described herein and shown in the drawings represents only a presently preferred embodiments of the invention. Indeed, various modifications and additions may be made to such embodiments without departing from the spirit and scope of the invention. For example, various different word sizes, pulse widths, numbers of cells within a data word, numbers of packets into which the original message is divided, number of guard cells, and type of error detection may be utilized.

Thus, these and other modifications and additions may be obvious to those skilled in the art and may be implemented to adapt the present invention for use in a variety of different applications.

What is claimed is:

1. A method for modulating a radio signal, the method comprising the steps of:
   a) predetermining a first time interval so as to define a data word;
   b) generating a synchronization pulse, the synchronization pulse initiating a single data word having a length of the predetermined first time interval; and
   c) generating a single data pulse within the data word after a second time interval with respect to the synchronization pulse, the length of the second time interval defining at least one character;
   d) wherein defining at least one character by the single data pulse within the data word after the second time interval with respect to the synchronization pulse enhances an energy efficiency of the radio signal while mitigating a duty cycle thereof.

2. The method as recited in claim 1 wherein the length of the second time interval defines only one character.

3. The method as recited in claim 1 wherein the step of generating the single data pulse within the data word after the second time interval comprises:
   a) generating the single data pulse having a pulse width of between approximately 200 $\mu$sec and approximately 250 $\mu$sec; and
   b) the predetermined first time interval comprises a time interval approximately equal to a multiple of between 600 $\mu$sec and 750 $\mu$sec.

4. The method as recited in claim 1 wherein the step of the predetermining the first time interval is repeated for each data word.

5. The method as recited in claim 1 wherein a plurality of characters so defined in turn define a packet, the packet being of a duration of less that approximately 0.5 seconds so as to mitigate fading, a plurality of such packets defining a message.

6. The method as recited in claim 5 further comprising the step of transmitting the message multiple times consecutively so as to enhance a probability of proper reception thereof.

7. The method as recited in claim 6 further comprising the steps of:
   a) transmitting information indicative of the packet's position within the message along with each packet;
   b) transmitting information indicative of the number of times that the message has been transmitted along with each message; and
   c) transmitting error detection information along with each packet.

8. The method as recited in claim 7 wherein the step of transmitting error detection information comprises transmitting a differential checksum calculated by alternately adding and subtracting the lengths of sequential second time intervals.

9. A method for modulating a radio signal, the method comprising the steps of:
   a) predetermining a first time interval so as to define a data word;
   b) generating a synchronization pulse, the synchronization pulse initiating a plurality of contiguous data words, each data word having a length of the predetermined first time interval; and
   c) generating a single data pulse within each data word, each data pulse being generated after a second time interval with respect to a beginning of the data word within which it is generated, the length of the second time interval defining at least one character;
   d) wherein so defining a plurality of characters utilizing a single synchronization pulse enhances an energy efficiency of the radio signal while mitigating a duty cycle thereof.

10. The method as recited in claim 9 wherein the length of the second time interval for the single data pulse within each data word defines only one character.

11. The method as recited in claim 9 further comprising the step of providing a time delay intermediate adjacent data words so as to facilitate processing thereof during demodulation.

12. The method as recited in claim 9 wherein a plurality of characters so defined in turn define a packet, each packet being of a duration of less that approximately 0.5 seconds so as to mitigate fading, a plurality of such packets defining a message.

13. The method as recited in claim 12 further comprising the step of transmitting the message multiple times consecutively so as to enhance a probability of proper reception thereof.

14. The method as recited in claim 13 further comprising the steps of:
   a) transmitting information indicative of the packet's position within the message along with each packet;
   b) transmitting information indicative of the number of times that the message has been transmitted along with each message; and
   c) transmitting error detection information along with each packet.

15. The method as recited in claim 14 wherein the step of transmitting error detection information comprises transmitting a differential checksum calculated by alternately adding and subtracting the lengths of sequential second time intervals.

16. A method for demodulating a radio signal, the method comprising the steps of:
   a) periodically monitoring an input port for the presence of a given state;

b) storing a predetermined number of the monitored states;

c) determining that a synchronization pulse has been received when the predetermined number of the stored states of the input port are in the given state;

d) starting a clock when the synchronization pulse has been determined to have been received;

e) again periodically monitoring the input port for the presence of the given state;

f) again storing a predetermined number of the monitored states;

g) determining that a data pulse has been received when the predetermined number of the stored states of the input port are in the given state;

h) reading a time interval from the clock when it has been determined that the data pulse has been received; and i) using the length of the time interval to define a character being represented thereby.

17. The method as recited in claim 16 wherein the step of periodically monitoring the input port for the presence of the given state comprises periodically monitoring the input port for the presence of a high state.

18. The method as recited in claim 16 wherein the step of periodically monitoring the input port for the presence of the given state comprises monitoring the input port at time intervals of between approximately 25 $\mu$sec and approximately 40 $\mu$sec.

19. The method as recited in claim 16 wherein the step of determining that a pulse has been received when the predetermined number of the stored states of the input port are in the given state comprises determining that the pulse has been received when six of the last eight stored states of the input port are in a given state.

20. The method as recited in claim 16 wherein the step of storing the predetermined number of the monitored states comprises storing the monitored states in a software implementation of a first in/first out buffer.

* * * * *